United States Patent [19]
Lefebvre

[11] Patent Number: 5,704,431
[45] Date of Patent: Jan. 6, 1998

[54] ACTIVE FACE PACKER WHEEL

[75] Inventor: Ron R. Lefebvre, Saskatoon, Canada

[73] Assignee: Clint Berscheid, Saskatchewan, Canada

[21] Appl. No.: 698,422

[22] Filed: Aug. 15, 1996

[51] Int. Cl.[6] ................................................. A01C 5/06
[52] U.S. Cl. .................................... 172/177; 111/194
[58] Field of Search ......................... 172/177, 538; 111/194, 195

[56] References Cited

U.S. PATENT DOCUMENTS

| | | | |
|---|---|---|---|
| 233,056 | 10/1880 | Wimpee | 172/177 |
| 719,898 | 2/1903 | Spitzenberg | 172/177 X |
| 1,695,165 | 12/1928 | Wilberg | 111/194 X |
| 1,943,620 | 1/1934 | Murray | 111/194 X |
| 2,331,819 | 10/1943 | West | 111/194 |
| 2,668,490 | 2/1954 | Oehler et al. | 111/194 X |
| 4,070,974 | 1/1978 | Stacy, Jr. | 111/194 X |
| 4,269,535 | 5/1981 | Schultz | 172/177 X |
| 4,275,671 | 6/1981 | Baker | 111/195 |

FOREIGN PATENT DOCUMENTS

| | | | |
|---|---|---|---|
| 594274 | 3/1960 | Canada | 111/194 |
| 1082029 | 7/1980 | Canada. | |
| 1263060 | 11/1989 | Canada. | |
| 2102655 | 5/1994 | Canada. | |
| 2092465 | 9/1994 | Canada. | |
| 2810221 | 7/1979 | Germany | 111/194 |
| 3516857 | 11/1986 | Germany | 111/194 |
| 127968 | 12/1928 | Switzerland | 111/195 |
| 880291 | 11/1981 | U.S.S.R. | 111/194 |

OTHER PUBLICATIONS

"Bourgault Pursuing Perfection", 5710 Air Hoe Drill.
"Bourgault Pursuing Perfection", Mounted Packer Systems.

Primary Examiner—Terry Lee Melius
Assistant Examiner—Christopher J. Novosad
Attorney, Agent, or Firm—Jones, Tular & Cooper, P.C.

[57] ABSTRACT

The invention provides a packer wheel to be towed behind agricultural equipment such as an air seeder, the wheel being used to pack the soil in which seed or fertilizer has been placed. The packer wheel includes a hub and a body extending from the hub to a peripheral wall. A plurality of circumferentially spaced slots extend from the peripheral wall inwardly of the wheel body. Adjacent slots define therebetween a fin which, due to the slots, is somewhat flexible. As the packer wheel rotates the fins will flex sightly, but enough to cause any mud, soil or debris that built up thereon to break away so that the packer wheel remains relatively clean, even in muddy conditions. The slots are shaped so that any mud or debris that builds up therein is automatically forced axially outwardly of the slots as the wheel rotates.

13 Claims, 6 Drawing Sheets

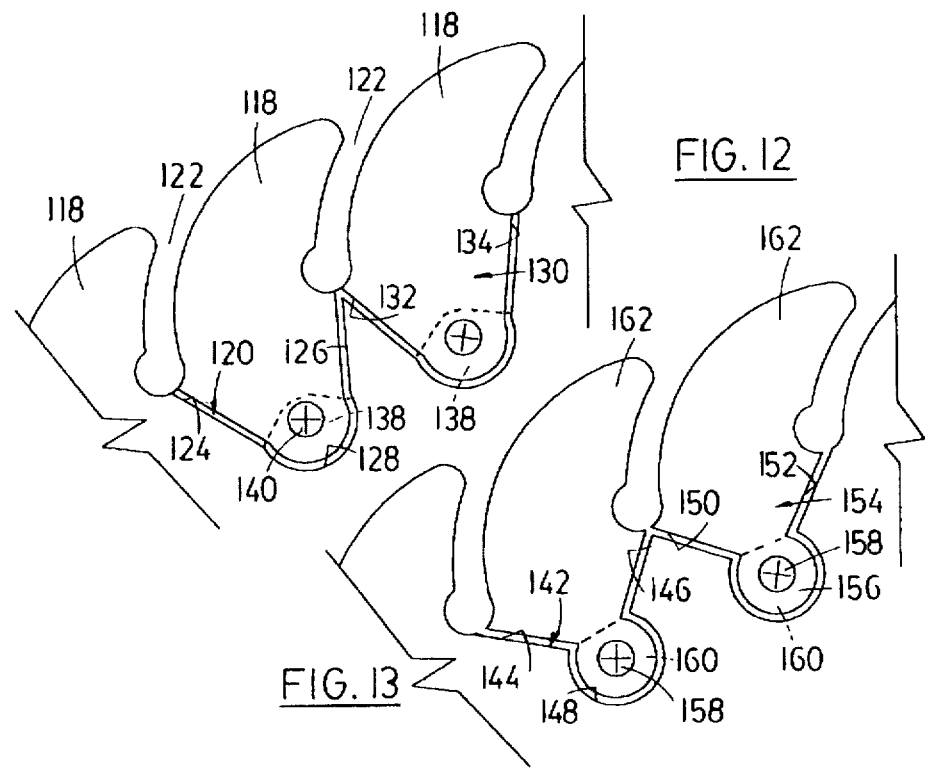
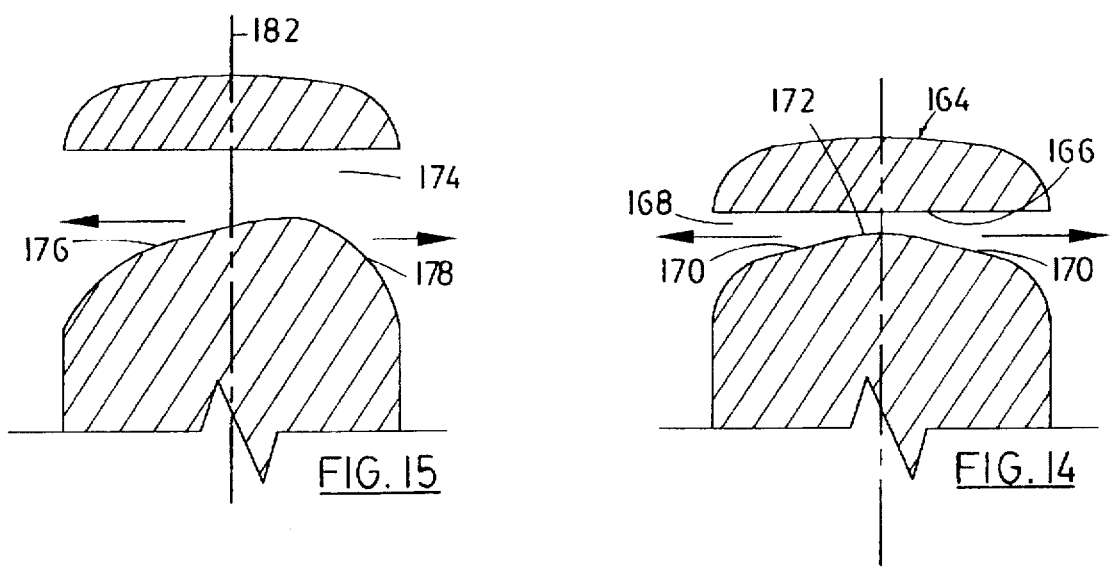

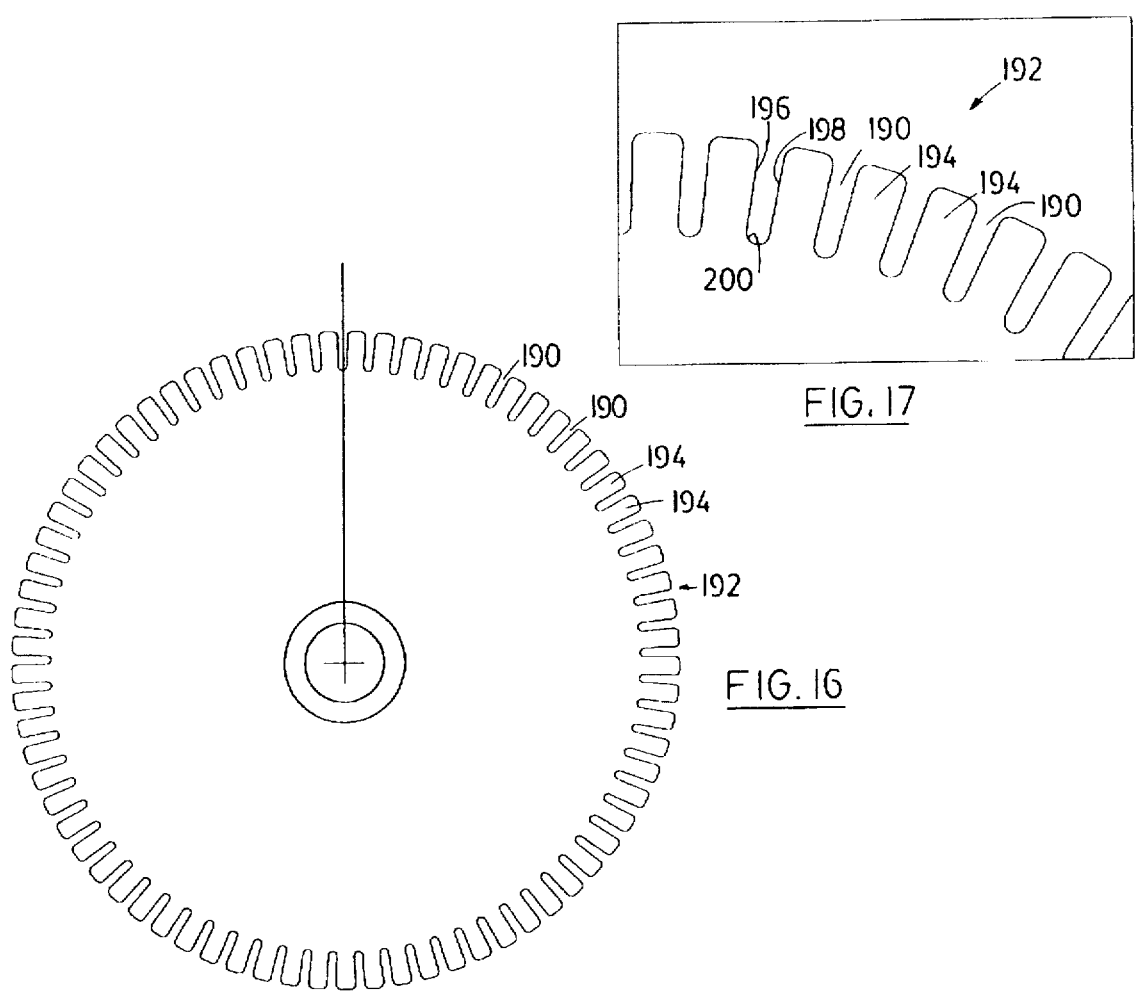

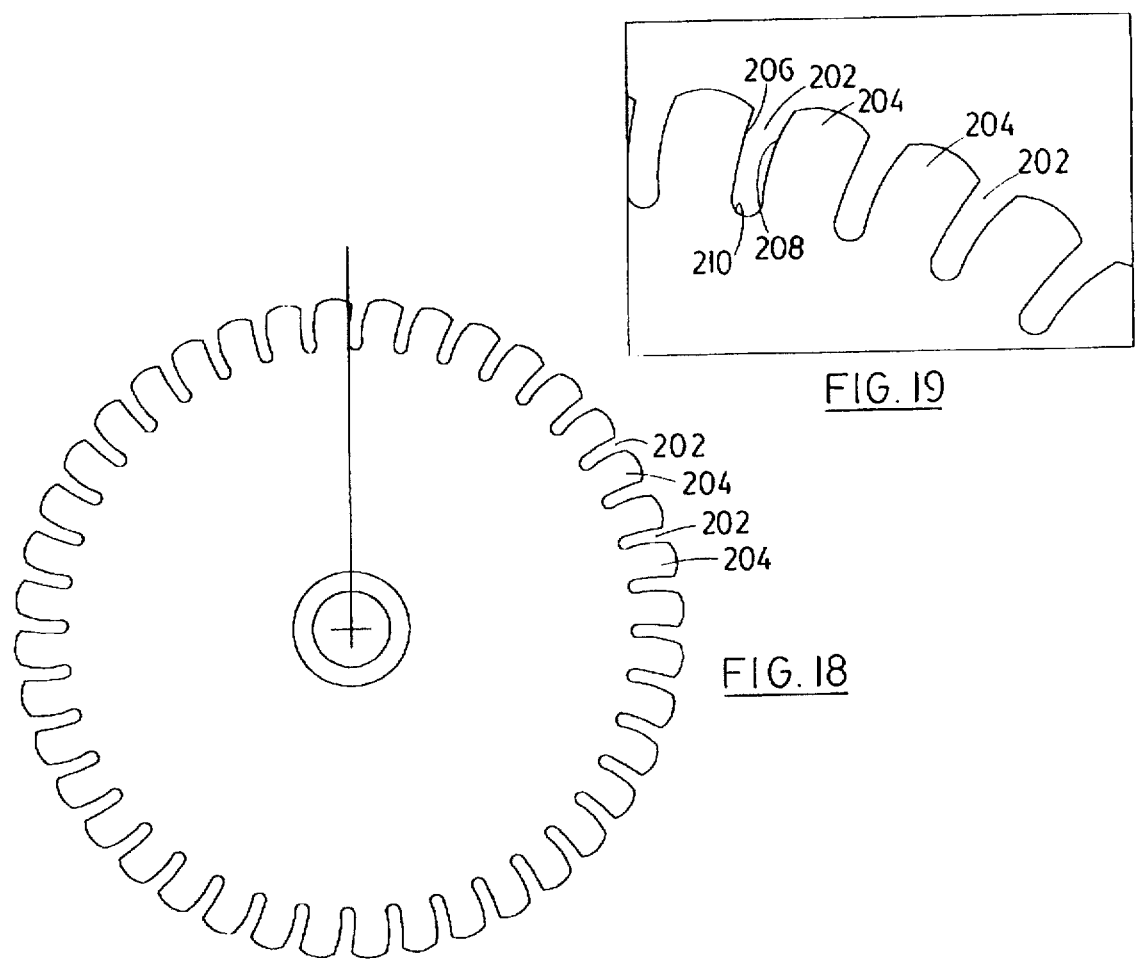

ACTIVE FACE PACKER WHEEL

The present invention relates to agricultural equipment in general and to the use of packer wheels with seed planting equipment in particular.

BACKGROUND OF THE INVENTION

Prairie farmers have, for many years, packed the soil after planting seed in order to improve germination of the seed and emergence of the plant. Packing is usually effected by way of a wheel which is towed behind the planting equipment, the wheel being loaded so as to apply a downwardly directed force on the soil behind the planter. The packer wheel may be positioned directly in line with the planter so as to pack the soil directly above the planted seeds or it may be positioned to one side of the planting line so as to pack the soil adjacent the planting line. With wide planting equipment used on the prairies there will typically be one packer wheel associated with each seeder shank or coulter although different manufacturers may position their components as they best see fit.

There are different packer wheel constructions available, each having its own advantages and disadvantages. The three types of packer wheel presently dominating the market are the all-steel wheel, the rubber rimmed wheel, and the plastic wheel. The steel wheel is used in applications where the land is very rocky, or the loading on the packer wheel is high; this is also the most expensive wheel available. The rubber rimmed wheel may be similar to a conventional automotive tire or it may involve a metal hub having a solid rubber band around the periphery. These wheels are commonly used where the soil has a strong clay content and would tend to stick to rigid wheels. The rubber rimmed wheel is also expensive and requires additional assembly steps during manufacture. The plastic wheel is becoming very common as it is economical to produce and it is also durable. The body and the operating periphery of the plastic wheel are moulded of the same material and hence such wheels have a solid and rigid periphery.

In clay or heavy soil conditions the steel wheel and present plastic wheel can have the soil build up on them, which can result in seed bed preparation problems for the farmer. The rubber rimmed wheel is one solution to this problem as the face thereof can flex and break away the built-up soil. The expense of the rubber rimmed wheel, however, is a deterrent to the widespread use of such wheels. There is a need for an inexpensive packer wheel which has a flexible face for use in moist and muddy soil conditions and which provides a desirable alternative to the rubber rimmed packer wheel.

SUMMARY OF THE INVENTION

The present invention provides the desired alternative to the rubber rimmed packer wheel. The packer wheel of this invention is preferably moulded from a plastic material so as to have integrally formed body and peripheral wall portions. The peripheral wall portion is made flexible by providing a plurality of circumferentially spaced slots which project inwardly of the wheel. A flexible fin is created between adjacent slots of the wheel so that as the wheel rotates the peripheral wall, made up of circumferentially adjacent flexible fins, will flex and cause any soil built up thereon to break away from the peripheral wall and thus keep the wheel relatively clean. Preferably, at least a portion of each slot extends at an angle with respect to a radius of the wheel at the intersection of the innermost end of the slot with the radius.

A number of different configurations for the flexible fin are available with this invention, the choice depending on the soil conditions expected to be encountered and the packing characteristics desired. For example, one can select from packer wheels of this invention which can provide a wide packing track, a smooth packing action, and/or a vibratory packing action.

In its broadest form, the present invention may be considered as providing a packer wheel for use with agricultural equipment, comprising: central hub means defining a rotational axis; wheel body means defining peripheral wall means and side wall means extending between the hub means and the peripheral wall means; and a plurality of circumferentially equally spaced slot means extending from the peripheral wall means into the side wall means so as to create a flexible fin means between each pair of adjacent slot means.

BRIEF DESCRIPTION OF THE DRAWINGS

FIGS. 12 and 13 show partial elevations of two embodiments in which the fins are pivotally connected to the wheel body.

FIGS. 14 and 15 show partial cross-sections, on the line A—A of FIG. 2, of two slot shapes which can be used with any of the embodiments of this invention.

FIGS. 16 and 17 show in elevation and enlargement yet another embodiment of this invention.

FIGS. 18 and 19 show in elevation and enlargement still another embodiment of the present invention.

DESCRIPTION OF THE PREFERRED EMBODIMENT

Figure 1:
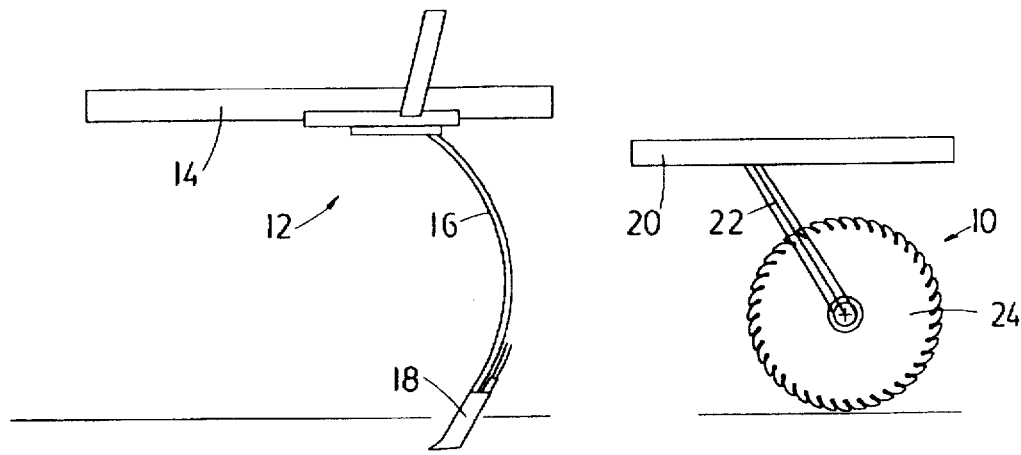
FIG. 1 shows in elevation a packer wheel being towed behind an agricultural implement such as a seed planter.

FIG. 1 shows very generally the positioning of a packer wheel assembly 10 behind a seed planting implement shown by the reference number 12. In this configuration the seed planting implement is towed behind a tractor (not shown) and includes an implement frame 14, a seeder shank 16 which extends into the soil and a seed placement device 18 for placing seed (or fertilizer) in the soil at a predetermined depth. The packer wheel assembly is physically connected to the implement 12 by any suitable means and includes a frame 20, wheel mounting means 22 and a packer wheel 24 which is used to pack the soil behind the device 18 above the planting line. The packer wheel may be spring loaded or otherwise mounted so that an adjustable vertical load may be applied thereto, the load depending on the seed being planted and the nature of the soil in which planting takes place. Usually the packer wheel is ground driven but it may be powered if required.

While this invention is described with reference to seed planting it should be understood that packing may also be used in association with spraying, cultivating, fertilizer application or other operations. Also, while the packing function is described herein as being accomplished at the same time as the planting function it should be understood that it could be performed as a separate field operation.

Figure 2:
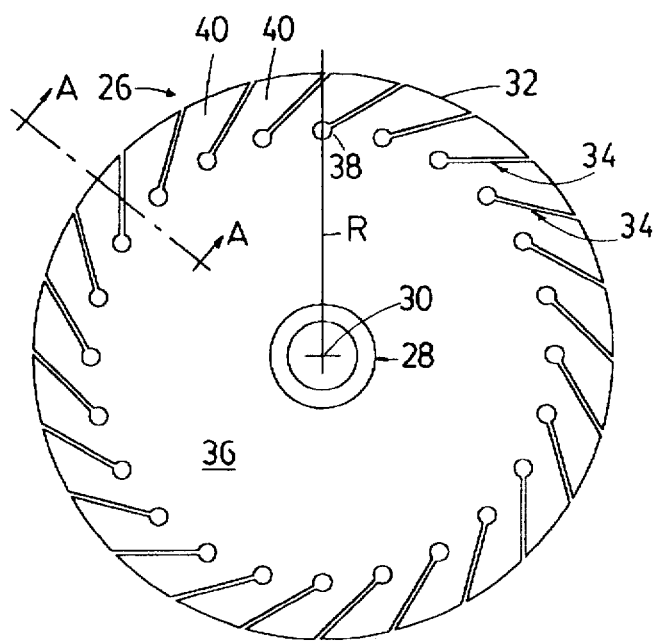
FIG. 2 shows in elevation a first embodiment packer wheel of this invention.
Figure 3:
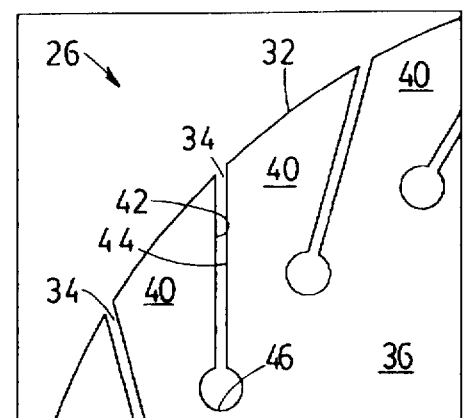
FIG. 3 shows an enlarged view of the peripheral wall of the embodiment of FIG. 2.

FIGS. 2 and 3 illustrate a first embodiment of a packer wheel incorporating the flexible fin feature of the present invention. In this embodiment a packer wheel 26 has a central hub 28 defining a rotational axis 30 and a wheel body that extends from the hub 28 to the peripheral wall 32 of the wheel. The central hub 28 may be the universal hub described and claimed in the commonly owned co-pending application of Clint Berscheid entitled "Universal Hub Assembly". A plurality of circumferentially equally spaced slots 34 extends inwardly of the wheel from the peripheral wall 32 thereof into the side wall 36 of the wheel body. Each slot is angled with respect to a radius R of the wheel at the innermost end 38 of the slot. A fin 40 is defined thus between each circumferentially adjacent pair of slots 34. As better seen in FIG. 3 each slot 34 has an outer face 42 and an inner face 44, these faces in this embodiment being generally parallel to each other. At its innermost end 38 the slot terminates in a transversely extending arcuate end face 46 which preferably is C-shaped and is of a diameter greater than the separation between the faces 42 and 44. The arcuate end termination of the slot may be termed as a "node".

Figure 4:
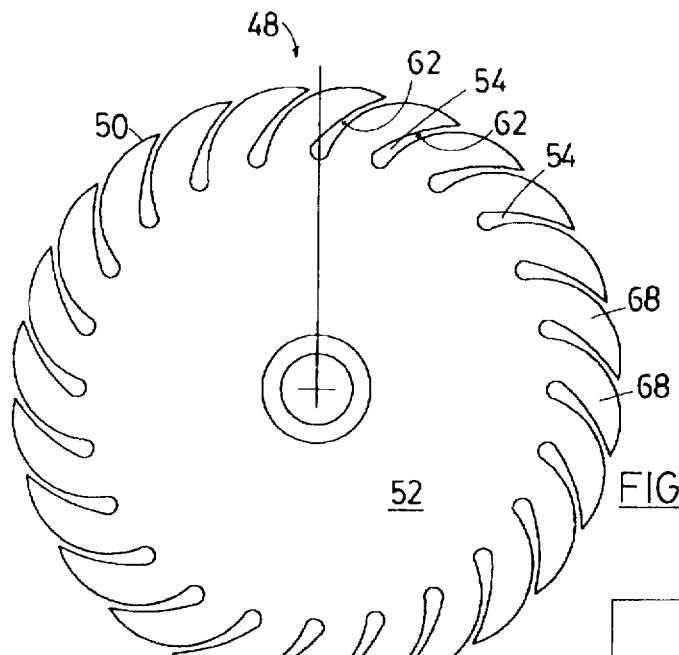
FIG. 4 shows in elevation a second embodiment packer wheel of this invention.
Figure 5:
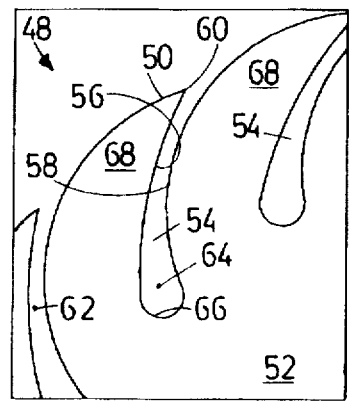
FIG. 5 shows an enlarged view of the peripheral wall of the embodiment of FIG. 4.

FIGS. 4 and 5 illustrate a second embodiment of this invention in which the wheel 48 is provided with differently shaped slots extending inwardly from the peripheral wall 50 into the side wall 52 of the wheel. In this case each slot 54 is generally arcuate with the outer face 56 thereof having a radius of curvature that is greater than that of the inner face 58. The inner face 58 smoothly merges with the peripheral wall 50 and meets the outer face of the adjacent slot at a sharp edge 60 on the peripheral wall. It is noted that the outer and inner faces are close together at a zone of convergence 62 and that they then diverge inwardly towards the innermost end 64 of the slot. The slot 54 terminates at a transversely extending arcuate end face 66. In this case circumferentially adjacent slots 54 define a fin 68 therebetween.

Figure 6:
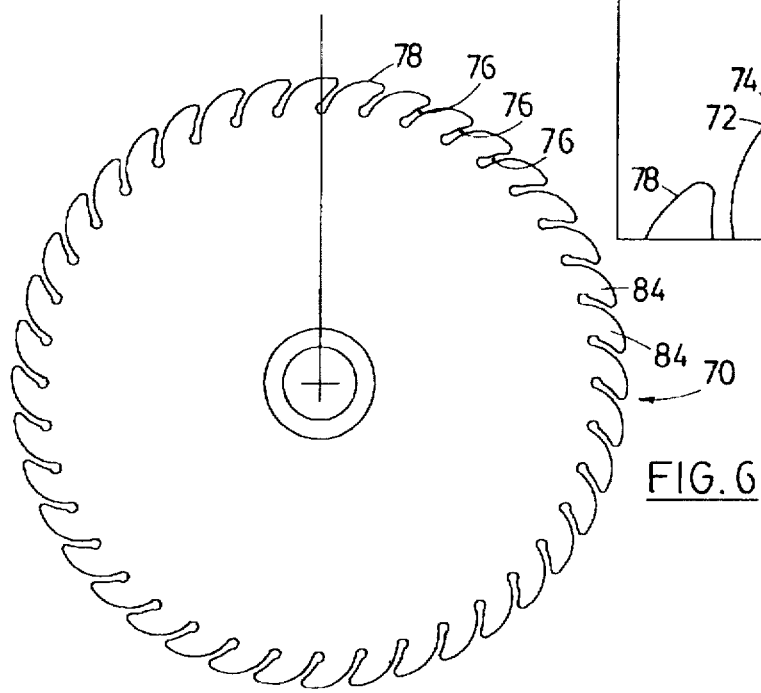
FIG. 6 shows in elevation a third embodiment packer wheel of this invention.
Figure 7:
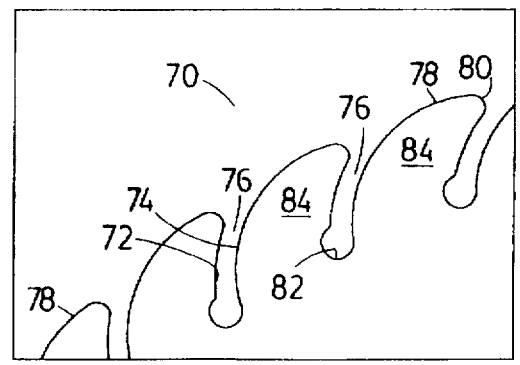
FIG. 7 shows an enlarged view of the peripheral wall of the embodiment of FIG. 6.

FIGS. 6 and 7 illustrate a variant 78 of the packer wheel shown in FIGS. 4 and 5, the slot faces of the wheel 70 also being arcuate but the radii of curvature thereof being almost equal such that the outer and inner faces 72 and 74 respectively are generally parallel to each other. The inner face 74 of one slot 76 curves smoothly into the peripheral wall 78 and meets the outer face 72 of the adjacent slot at an arcuate edge 80 on the peripheral wall. Each slot terminates at a transversely extending arcuate end wall 82 which preferably has a diameter greater than the separation of the outer and inner faces at the innermost end of the slot. Circumferentially adjacent slots 76 define a fin 84 therebetween.

Figure 9:
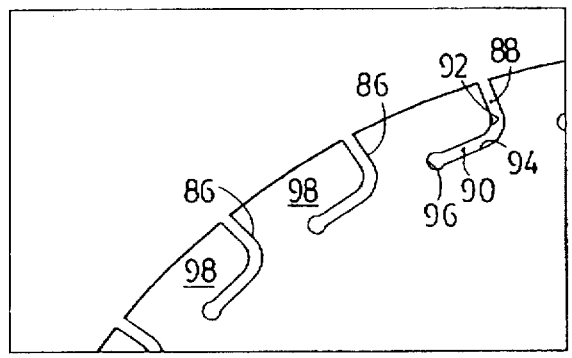
FIG. 9 shows an enlarged view of the peripheral wall of the embodiment of FIG. 8.
Figure 8:
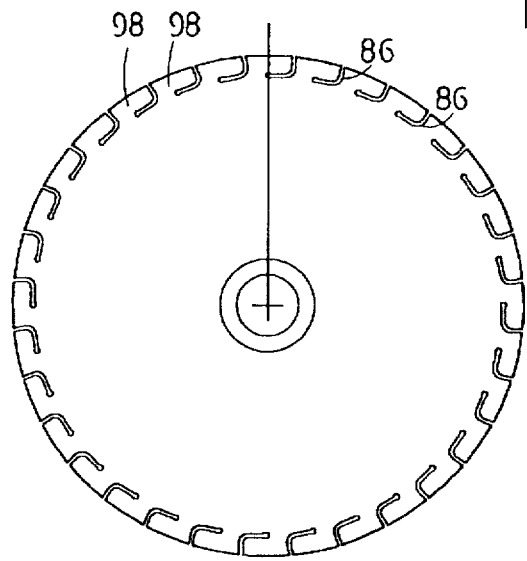
FIG. 8 shows in elevation a fourth embodiment packer wheel of this invention.

FIGS. 8 and 9 illustrate yet another embodiment of the present invention. In this case, each slot 86 is generally L-shaped with a first portion 88 of the slot extending along a radius of the wheel and then curving into a second portion 90 which extends generally normal to the first portion. The outer and inner faces 92 and 94 respectively of the slot are generally parallel to each other. The slot terminates at its innermost end at a transversely arcuate end face 96 which preferably is C-shaped and has a diameter greater than the separation between the outer and inner faces of the slot. Circumferentially adjacent slots 86 define a fin 98 therebetween.

Figure 11:
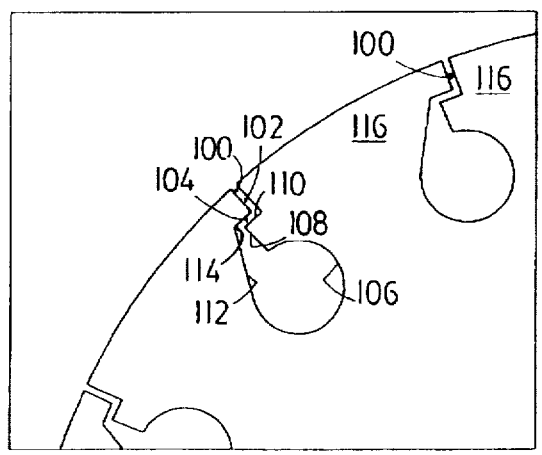
FIG. 11 shows an enlarged view of the peripheral wall of the embodiment of FIG. 10.
Figure 10:
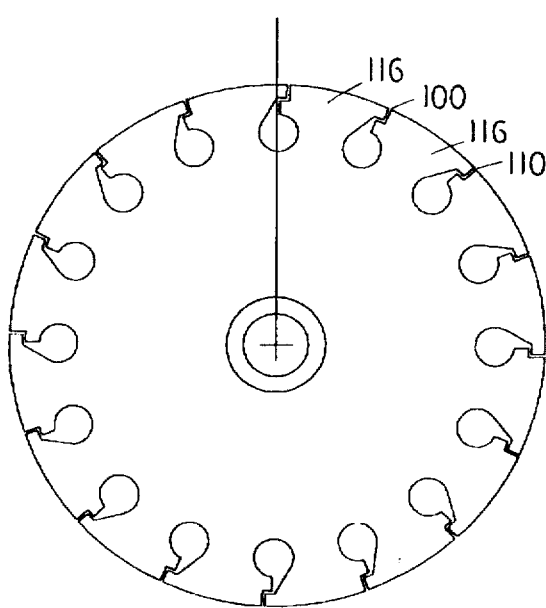
FIG. 10 shows in elevation a fifth embodiment packer wheel of this invention.

The embodiment of FIGS. 10 and 11 is a variation on that of FIG. 8 and 9 in that the slots 100 thereof are generally L-shaped, although the transition between the radial and normal portions 102 and 104 thereof is sharp rather than smooth and the node for each slot is larger. In this case the node is in the form of a large generally circular transversely extending opening 106, there being a radial slot face 108 extending from the innermost end of the slot inner face 110 to the opening 106. An angled slot face 112 extends from the innermost end of the outer slot face 114 to the opening opposite the junction of the radial slot face 108 with the opening 106. As can be seen, the radial slot face meets the opening at a sharp edge while the angled slot face is generally tangential to the wall of the opening. Circumferentially adjacent slots 100 define a fin 116 therebetween.

FIGS. 12 and 13 illustrate two designs in which the fins are not integrally formed as part of the wheel as they are with the first five embodiments. In the embodiments of FIGS. 12 and 13 the fins are removable or interchangeable so that they can be replaced if damaged in use. In FIG. 12 each fin 118 is similar to that of FIGS. 6 and 7. A pocket 120 extends into the wheel body between adjacent slots 122, the pocket being defined by converging transverse pocket walls 124 and 126, those walls terminating at a circular recess 128. Each fin 118 has a lug portion 130 defined by converging lug walls 132 and 134. The lug walls terminate at a lobe portion 136 which is bifurcated so that each part thereof fits into the recess 128 on opposite sides of a central wall 138 that divides the recess 128 in half. A pin 140 passes from one lobe part, through the central wall, and then through the other lobe part to fix the fin 118 to the wheel body. The fin can pivot slightly about the pin 140 and the pin can be removed so that the fin itself can be removed and replaced.

In the embodiment of FIG. 13 the pocket 142 is defined by sharply converging pocket walls 144, 146 which terminate at a generally C-shaped recess 148 on one side of the wheel. The sharply converging lug walls 150 and 152 of the fin lug portion 154 terminate at a mating C-shaped lobe 156 on the same side of the fin as the recess 148. In order to connect the fin to the wheel body recess 148 a pin 158 passes through the lobe 156 and the portion 160 of the wheel body backing the recess 148. Removal of the pin 158 will permit the lobe 156 to be removed laterally from the recess 148 so that the fin 162 can be removed and replaced as required.

FIGS. 14 and 15 illustrate partial radial cross-sectional views taken on the line A—A of FIG. 2, of a packer wheel of this invention, showing the transverse shape of the slots. In FIG. 14 a fin 164 is shown as having a straight transverse outer slot face 166 parallel to the rotational axis of the wheel while the inner face of the slot 168 has adjacent portions 170 which converge symmetrically radially outwardly to a rounded peak 172. Dirt, mud or soil trapped in the slot 168 will be forced axially outwardly as the fin 164 is forced radially inwardly during rotation of the packer wheel.

In FIG. 15 the inner face of the slot 174 has adjacent portions 176, 178 which converge asymmetrically radially outwardly to a peak 180 that is offset to one side of the longitudinal centerline 182 of the wheel. In this case debris caught in the slot 174 will be forced more to the left as seen in FIG. 15 than to the right.

In FIGS. 16 and 17 the slots 190 extend generally radially inwardly from the peripheral wall of the packer wheel 192 so as to define fins 194 therebetween. The inner and outer faces 196, 198 of the slots can be generally parallel, terminating at an arcuate inner end wall 200.

In FIGS. 18 and 19 the slots 202 extend inwardly from the peripheral wall of the packer wheel along a slightly arcuate, non-radial line to define the fins 204 therebetween. The inner and outer faces 206, 208 of the slots are not parallel, the faces converging slightly along arcuate lines to the arcuate inner end wall 210.

It will be apparent from FIGS. 1 to 11, and 14 to 19 that the packer wheel of this invention may be integrally moulded of a suitable plastics material and thus may be solid or, as seen in FIGS. 12 and 13, it may be moulded with a solid wheel body and a plurality of separate moulded fins removably attachable to the wheel body. The slots between the fins and the arcuate node at the end of each slot promote limited flexural movement of each fin as the packer wheel rotates, such movement being not unlike the flexing movement of a rubber rimmed wheel. The flexing movement of each fin allows for any mud or debris that might attach to the packer wheel in use to be removed therefrom as the wheel rotates and the fin flexes. The shape of the slots as mentioned with respect to FIGS. 14 and 15 promotes the automatic removal of mud or other debris from the slots as the wheel rotates on its axis.

The packer wheel of this invention is economical to produce in any of its embodiments and it is effective in operation, providing the advantages of the rubber rimmed packer wheel at a fraction of its cost. It should be understood that the foregoing has described the preferred embodiment and variations thereto of the present invention. It is expected that skilled workmen could create further variations of the invention without departing from the spirit of the invention as described herein. Accordingly the protection to be afforded this invention is to be determined from the scope of the claims appended hereto.

I claim:

1. A packer wheel for use with agricultural equipment, comprising: central hub means defining a rotational axis; wheel body means defining peripheral wall means and side wall means extending between said hub means and said peripheral wall means; and a plurality of circumferentially equally spaced slot means extending from said peripheral wall means into said side wall means so as to create a flexible fin means between each pair of adjacent slot means; at least a portion of each slot means being angled relative to a radius of said wheel at the intersection of such radius with an innermost end of such slot means; and each slot means being defined by parallel, generally straight outer and inner faces and terminating at the innermost end thereof at a transversely extending generally arcuate end face.

2. The packer wheel of claim 1 wherein said arcuate end face is generally C-shaped and has a diameter greater than the separation between said outer and inner faces.

3. The packer wheel of claim 1 wherein said outer face of each said slot means extends transversely through said wheel body means parallel to said rotational axis and said inner face thereof includes adjacent portions which converge radially outwardly from the side wall means of said wheel body means towards said outer face.

4. The packer wheel of claim 3 wherein said inner face adjacent portions converge symmetrically to a peak at a longitudinal centerline of said wheel.

5. The packer wheel of claim 3 wherein said inner face adjacent portions converge asymmetrically to a peak spaced laterally from a longitudinal centerline of said wheel.

6. A packer wheel for use with agricultural equipment, comprising: central hub means defining a rotational axis; wheel body means defining peripheral wall means and side wall means extending between said hub means and said peripheral wall means; and a plurality of circumferentially equally spaced slot means extending arcuately from said peripheral wall means into said side wall means so as to create a flexible fin means between each pair of adjacent slot means; each said slot means being defined by arcuate outer and inner faces, said outer face having a greater radius of curvature than said inner face, said slot means terminating at the innermost end thereof at a transversely extending generally arcuate end face.

7. The packer wheel of claim 6 wherein said outer and inner faces have a zone of convergence and diverge inwardly therefrom towards said end face, the inner face of one slot means meeting the outer face of the adjacent slot means at a sharp outer edge of the fin means defined between such slot means.

8. The packer wheel of claim 6 wherein said outer and inner faces are generally parallel, the inner face of one slot means meeting the outer face of the adjacent slot means at a rounded outer edge of the fin means defined between such slot means.

9. The packer wheel of claim 8 wherein said arcuate end face is generally C-shaped and has a diameter greater than the separation between said outer and inner faces.

10. A packer wheel for use with agricultural equipment, comprising: central hub means defining a rotational axis; wheel body means defining peripheral wall means and side wall means extending between said hub means and said peripheral wall means; and a plurality of circumferentially equally spaced slot means extending from said peripheral wall means into said side wall means so as to create a flexible fin means between each pair of adjacent slot means; each of said slot means being generally L-shaped, with one portion of said slot means lying along a radius of said wheel and the other portion of said slot means being generally normal to the one portion thereof, and each said portion being defined by parallel, generally straight outer and inner faces, said slot means terminating at the innermost end thereof at a transversely extending generally arcuate end face.

11. The packer wheel of claim 10 wherein said arcuate end face is generally C-shaped and has a diameter greater than the separation between said outer and inner faces.

12. The packer wheel of claim 10 wherein said slot means terminates at an enlarged generally circular opening through said wheel body means, there being a radial slot face extending from the innermost end of said inner face to said opening and an angled slot face extending from the innermost end of said outer face to said opening.

13. A packer wheel for use with agricultural equipment, comprising: central hub means defining a rotational axis; wheel body means defining peripheral wall means and side wall means extending between said hub means and said peripheral wall means; and a plurality of circumferentially equally spaced slot means extending from said peripheral wall means into said side wall means generally along a radius of said wheel so as to create a flexible fin means between each pair of adjacent slot means; each of said slot means being defined by generally parallel, generally straight outer and inner faces and terminating at the innermost end thereof at a transversely extending arcuate end face.

* * * * *